US012756111B2

(12) United States Patent
Hasegawa

(10) Patent No.: US 12,756,111 B2
(45) Date of Patent: Oct. 6, 2026

(54) ARRAY ANTENNA

(71) Applicant: Fujikura Ltd., Tokyo (JP)

(72) Inventor: Yuta Hasegawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 19/127,866

(22) PCT Filed: Jul. 21, 2023

(86) PCT No.: PCT/JP2023/026826
§ 371 (c)(1),
(2) Date: May 7, 2025

(87) PCT Pub. No.: WO2024/105933
PCT Pub. Date: May 23, 2024

(65) Prior Publication Data
US 2026/0180202 A1 Jun. 25, 2026

(30) Foreign Application Priority Data
Nov. 16, 2022 (JP) ................................. 2022-183038

(51) Int. Cl.
*H01Q 21/06* (2006.01)
*H01Q 1/38* (2006.01)
*H01Q 21/08* (2006.01)

(52) U.S. Cl.
CPC ............. *H01Q 21/061* (2013.01); *H01Q 1/38* (2013.01); *H01Q 21/065* (2013.01); *H01Q 21/08* (2013.01)

(58) Field of Classification Search
CPC ...... H01Q 1/38; H01Q 21/065; H01Q 1/2283; H01Q 1/48; H01Q 9/42; H01Q 21/0006;
(Continued)

(56) References Cited

U.S. PATENT DOCUMENTS 5,966,102 A * 10/1999 Runyon ................. H01Q 21/08 343/820
6,317,094 B1 * 11/2001 Wu .................... H01Q 21/0087 343/770
(Continued)

FOREIGN PATENT DOCUMENTS

CN 108666743 A 10/2018
EP 0891643 B1 7/2000
(Continued)

OTHER PUBLICATIONS

International Search Report dated Sep. 19, 2023, issued in counterpart International Application No. PCT/JP2023/026826. (2 pages).
(Continued)

*Primary Examiner* — Monica C King
(74) *Attorney, Agent, or Firm* — WHDA, LLP

(57) ABSTRACT

An array antenna includes radiation elements that excite a first polarized wave and a second polarized wave, and that are arranged in an array. A first power feed point and a second power feed point are disposed on each of the radiation elements. The radiation elements include a first radiation element in which the second power feed point is located at a position of +θ° (0<θ≤90) in a direction circling around a center of each of the radiation elements with respect to a reference line extending from the center to the first power feed point, and a second radiation element in which the second power feed point is located at a position of −θ° in a direction circling around the center with respect to a reference line extending from the center to the first power feed point.

5 Claims, 5 Drawing Sheets

(58) Field of Classification Search

CPC .... H01Q 9/0457; H01Q 21/0075; H01Q 7/00; H01Q 23/00; H01Q 1/36; H01Q 1/243; H01Q 3/38; H01Q 13/08; H01Q 13/203; H01Q 1/02; H01Q 13/206; H01Q 5/357; H01Q 5/371; H01Q 9/0414; H01Q 9/40; H01Q 1/3275; H01Q 1/40; H01Q 5/378; H01Q 9/045; H01Q 1/22; H01Q 21/06; H01Q 21/061; H01Q 21/08; H01Q 21/28; H01Q 3/26; H01Q 3/2682; H01Q 9/0421; H01Q 9/26; H01Q 1/24; H01Q 1/3283; H01Q 9/16; H01Q 9/28; H01Q 1/2208; H01Q 1/42; H01Q 1/523; H01Q 13/10; H01Q 13/18; H01Q 13/22; H01Q 21/0043; H01Q 21/24; H01Q 21/30; H01Q 3/34; H01Q 3/36; H01Q 3/40; H01Q 5/385; H01Q 9/065; H01Q 9/27; H01Q 9/285; H01Q 1/12; H01Q 1/246; H01Q 1/325; H01Q 1/50; H01Q 15/02; H01Q 21/0025; H01Q 21/0037; H01Q 21/29; H01Q 3/01; H01Q 3/06; H01Q 3/2605; H01Q 3/28; H01Q 3/44; H01Q 9/30; H01Q 1/005; H01Q 1/085; H01Q 1/1207; H01Q 1/1214; H01Q 1/20; H01Q 1/2225; H01Q 1/3225; H01Q 1/3291; H01Q 1/52; H01Q 1/526; H01Q 13/02; H01Q 17/004; H01Q 19/134; H01Q 19/19; H01Q 21/0031; H01Q 21/0087; H01Q 21/0093; H01Q 21/12; H01Q 21/205; H01Q 21/22; H01Q 21/293; H01Q 25/004; H01Q 25/005; H01Q 25/008; H01Q 3/04; H01Q 3/2617; H01Q 3/2676; H01Q 3/385; H01Q 3/42; H01Q 5/335; H01Q 5/364; H01Q 5/40; H01Q 5/50; H01Q 9/0407; H01Q 9/0464; H01Q 9/36; H01Q 1/1271; H01Q 1/14; H01Q 1/32; H01Q 1/44; H01Q 1/46; H01Q 13/106; H01Q 21/005

See application file for complete search history.

(56) References Cited

U.S. PATENT DOCUMENTS

| | | | | |
|---|---|---|---|---|
| 2008/0211726 | A1* | 9/2008 | Elsallal .................. | H01Q 13/08 343/770 |
| 2015/0280329 | A1* | 10/2015 | Sanford ................... | H01Q 1/06 343/837 |
| 2017/0310017 | A1 | 10/2017 | Howard | |
| 2019/0140364 | A1* | 5/2019 | Mirmozafari .......... | H01Q 1/246 |
| 2019/0221947 | A1 | 7/2019 | Zihir et al. | |
| 2020/0028277 | A1* | 1/2020 | Watson .................. | H01Q 21/26 |
| 2020/0091608 | A1* | 3/2020 | Alpman ............... | H01Q 9/0414 |
| 2020/0412025 | A1 | 12/2020 | Oshima | |
| 2021/0098895 | A1 | 4/2021 | Oshima et al. | |

FOREIGN PATENT DOCUMENTS

| | | | |
|---|---|---|---|
| JP | 2-116202 | A | 4/1990 |
| JP | 5-41608 | A | 2/1993 |
| JP | 2000-508144 | A | 6/2000 |
| JP | 2021-5795 | A | 1/2021 |
| JP | 2021-52337 | A | 4/2021 |
| WO | 97/38465 | A1 | 10/1997 |

OTHER PUBLICATIONS

Hall, P.S., Dual polarisation antenna arrays with sequentially rotated feeding, IEE Proceedings-H, Microwaves, Antennas and Propagation, vol. 139, No. 5, p. 465-471, 1992, XP000355102 (7 pages); Cited in European Search Report dated Feb. 2, 2026.

* cited by examiner

ARRAY ANTENNA

TECHNICAL FIELD

The present invention relates to an array antenna.

Priority is claimed on Japanese Patent Application No. 2022-183038, filed Nov. 16, 2022, the content of which is incorporated herein by reference.

BACKGROUND ART

In order to increase a capacity of wireless communication, a higher frequency band is being considered. As an antenna that can obtain a high gain in a high frequency band, an array antenna having a plurality of radiation elements is used. The array antenna can adjust a main beam direction of radiated electromagnetic waves by controlling a phase difference applied to a signal input to each radiation element (for example, see Patent Document 1). The array antenna can use two polarized waves having different polarization planes.

CITATION LIST

Patent Document

Patent Document 1: Japanese Unexamined Patent Application, First Publication No. 2021-5795

SUMMARY OF INVENTION

Technical Problem

The above-described array antenna may output unnecessary polarized waves.

One aspect of the present invention provides an array antenna capable of reducing unnecessary polarized waves.

Solution to Problem

According to Aspect 1 of the present invention, there is provided an array antenna including a plurality of radiation elements that excite a first polarized wave and a second polarized wave different from the first polarized wave, in which a first power feed point that excites the first polarized wave and a second power feed point that excites the second polarized wave are disposed on each of the radiation elements, the plurality of radiation elements are arranged in an array or in a matrix, and the plurality of radiation elements include a first radiation element in which the second power feed point is located at a position of +θ° (0<θ≤90) in a direction circling around a center of each of the radiation elements with respect to a reference line extending from the center to the first power feed point, and a second radiation element in which the second power feed point is located at a position of −θ° in a direction circling around a center of each of the radiation elements with respect to a reference line extending from the center to the first power feed point.

With this configuration, a relative angle between the first power feed point and the second power feed point is different between the plurality of radiation elements, so that part of unnecessary polarized waves of the plurality of radiation elements is canceled out. Accordingly, it is possible to reduce unnecessary polarized waves as compared with a case where the relative angles between the power feed points in the plurality of radiation elements are the same.

According to Aspect 2 of the present invention, in the array antenna according to Aspect 1, the number of the first radiation element having the second power feed point located at the position of +θ° is equal to the number of the second radiation element having the second power feed point located at the position of −θ°.

According to Aspect 3 of the present invention, in the array antenna according to Aspect 1 or Aspect 2, the first radiation element having the second power feed point located at the position of +θ° is adjacent to the second radiation element having the second power feed point located at the position of −θ°.

According to Aspect 4 of the present invention, in the array antenna according to any one of Aspect 1 to Aspect 3, the plurality of radiation elements are arranged in a matrix in a first direction and a second direction intersecting the first direction, the radiation elements adjacent to each other in the first direction each has the second power feed point located at different positions in the second direction with respect to a center of each of the radiation elements, and the radiation elements adjacent to each other in the second direction each has the first power feed point located at different positions in the first direction with respect to a center of each of the radiation elements.

According to Aspect 5 of the present invention, in the array antenna according to any one of Aspect 1 to Aspect 4, the radiation elements adjacent to each other in the first direction each has the first power feed point located at the same position in the first direction with respect to a center of each of the radiation elements, and the radiation elements adjacent to each other in the second direction each has the second power feed point located at the same position in the second direction with respect to a center of each of the radiation elements.

Advantageous Effects of Invention

One aspect of the present invention provides an array antenna capable of reducing unnecessary polarized waves.

DESCRIPTION OF EMBODIMENTS

Array antennas according to embodiments will be described in detail with reference to the drawings.

[Array Antenna]

First Embodiment

Figure 1:
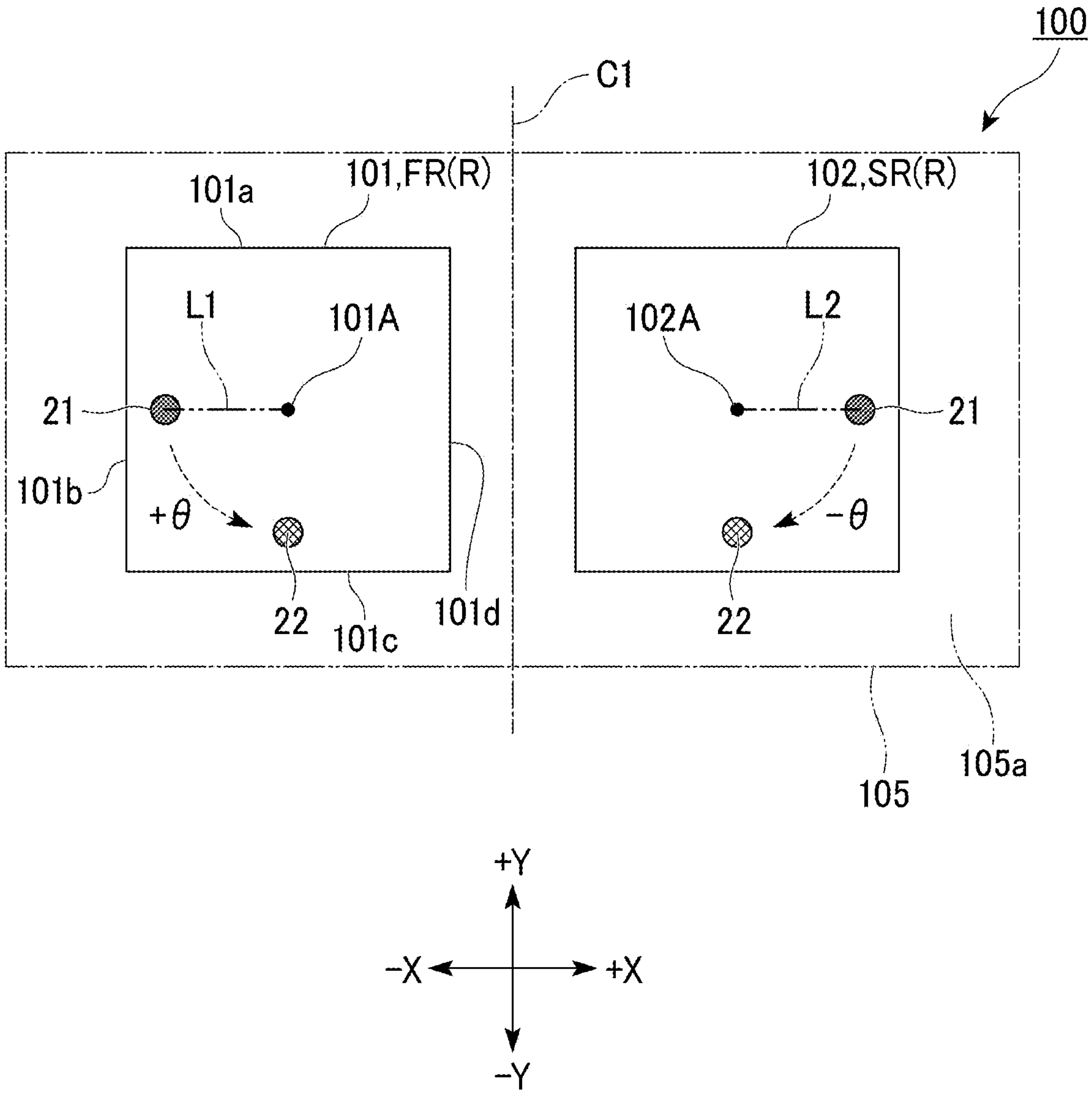
FIG. 1 A plan view of an array antenna of a first embodiment.

FIG. 1 is a plan view of an array antenna 100 according to a first embodiment.

A positional relationship of each configuration in which an XY orthogonal coordinate system is set will be described. An X direction is a direction of a first side 101$a$ of a first radiation element 101. A Y direction is a direction orthogonal to the first side 101$a$ in a plane along the first radiation element 101. The X direction is an example of a "first direction". The Y direction is an example of a "second direction".

A view seen in a direction orthogonal to the X direction and the Y direction is referred to as "plan view". One direction (right direction in FIG. 1) along the X direction is referred to as a "+X direction". A direction opposite to the +X direction is referred to as a "−X direction". One direction (upward direction in FIG. 1) along the Y direction is referred to as a "+Y direction". A direction opposite to the +Y direction is referred to as a "−Y direction".

As shown in FIG. 1, the array antenna 100 includes a plurality of radiation elements R and a substrate 105 made of a dielectric material. The array antenna 100 is a phased array antenna. The plurality of radiation elements R include a first radiation element 101 and a second radiation element 102.

The first radiation element 101 and the second radiation element 102 are formed on one surface 105*a* of the substrate 105. The first radiation element 101 and the second radiation element 102 are examples of radiation elements. The first radiation element 101 and the second radiation element 102 may be collectively referred to as "radiation elements 101 and 102". The radiation elements 101 and 102 are, for example, patch antennas.

The radiation elements 101 and 102 are formed in a rectangular shape (for example, a square shape) in plan view. The first side 101*a* and a third side 101*c* of the first radiation element 101 are parallel to the X direction. The first side 101*a* and the third side 101*c* face each other. A second side 101*b* and a fourth side 101*d* are parallel to the Y direction. The second side 101*b* and the fourth side 101*d* face each other. The second radiation element 102 may have the same shape as the first radiation element 101 in plan view.

A first center 101 A (center) is set in the first radiation element 101. The first center 101A is located, for example, at the center of gravity of the first radiation element 101 having a rectangular shape in plan view. The center of gravity of the first radiation element 101 is an intersection of two diagonals of the first radiation element 101. A second center 102A (center) is set in the second radiation element 102. The second center 102A is located, for example, at the center of gravity of the second radiation element 102 having a rectangular shape in plan view. The center of gravity of the second radiation element 102 is an intersection of two diagonals of the second radiation element 102.

The radiation elements 101 and 102 are arranged in an array. The array of the present embodiment is a one-dimensional arrangement form having either rows or columns.

The second radiation element 102 is located on a +X direction side with respect to the first radiation element 101. The first radiation element 101 and the second radiation element 102 are arranged in the X direction at intervals. The first radiation element 101 is adjacent to the second radiation element 102 in the X direction.

The radiation elements 101 and 102 can excite two polarized waves. Specifically, the radiation elements 101 and 102 can excite a first polarized wave and a second polarized wave. The second polarized wave is different from the first polarized wave. For example, a polarization plane of the second polarized wave is orthogonal to a polarization plane of the first polarized wave. The array antenna 100 can excite the first polarized wave and the second polarized wave and is thus a dual-polarization array antenna. In the array antenna 100, any one of the first polarized wave or the second polarized wave can be used as a main polarized wave. When the main polarized wave is the first polarized wave, the second polarized wave may be an unnecessary polarized wave. When the main polarized wave is the second polarized wave, the first polarized wave may be an unnecessary polarized wave.

In plan view, one first power feed point 21 and one second power feed point 22 are disposed in each of regions of the radiation elements 101 and 102. The first power feed point 21 is provided to excite the first polarized wave. The second power feed point 22 is provided to excite the second polarized wave.

The power feed points 21 and 22 of the radiation elements 101 and 102 are electrically connected to a common integrated circuit (not shown) via a wiring line. The radiation element and the integrated circuit are not limited to the wiring line and may be connected by electromagnetic coupling. The integrated circuit includes, for example, a phase shifter. The array antenna 100 can adjust a main beam direction of radiated electromagnetic waves by controlling a phase difference applied to a signal input to each radiation element.

In the first radiation element 101, the first power feed point 21 and the second power feed point 22 are located away from the first center 101A. In the first radiation element 101, the first power feed point 21 is located on a −X direction side with respect to the first center 101A. A straight line extending from the first center 101A to the first power feed point 21 in plan view (that is, a straight line passing through the first center 101A and the first power feed point 21) is referred to as a first reference line L1. Hereinafter, in plan view, a straight line extending from a center of one radiation element R toward the first power feed point 21 in the radiation element R will also be referred to as a reference line.

In the first radiation element 101, the second power feed point 22 is located on a −Y direction side with respect to the first center 101A. The second power feed point 22 is located at a position of +θ° (0<θ≤90) in a circumferential direction of the first center 101A (in a direction circling the center) with respect to the first reference line L1. The term "circumferential direction" is, for example, a counterclockwise direction in FIG. 1. A radiation element in which the second power feed point 22 is located at a position of +θ° (0<θ≤90) in the direction circling the center with respect to the reference line extending from the center of the radiation element R to the first power feed point 21 is hereinafter also referred to as a first radiation element FR. In the present embodiment, the second power feed point 22 is located at a position of +90° in the circumferential direction of the first center 101A with respect to the first reference line L1.

The term "circumferential direction" is not limited to the counterclockwise direction and may be a clockwise direction.

In the second radiation element 102, the first power feed point 21 and the second power feed point 22 are located away from the second center 102A. In the second radiation element 102, the first power feed point 21 is located on the +X direction side with respect to the second center 102A. A straight line extending from the second center 102A to the first power feed point 21 in plan view is referred to as a second reference line L2 (reference line).

In the second radiation element 102, the second power feed point 22 is located on the −Y direction side with respect to the second center 102A. The second power feed point 22 is located at a position of −θ° (0<θ≤90) in a circumferential direction of the second center 102A with respect to the second reference line L2. A radiation element in which the second power feed point 22 is located at a position of −θ° (0<θ≤90) in the direction circling the center with respect to the reference line extending from the center of the radiation element R to the first power feed point 21 is hereinafter also referred to as a second radiation element SR. In the present embodiment, the second power feed point 22 is located at a position of −90° in the circumferential direction of the second center 102A with respect to the second reference line L2.

In the present embodiment, the first radiation element FR is adjacent to the second radiation element SR in the X direction.

The first radiation element 101 and the second radiation element 102 have the first power feed points 21 located at different positions in the X direction with respect to the centers of the radiation elements. Specifically, the position in the X direction of the first power feed point 21 with respect to the first center 101A in the first radiation element 101 is different from the position in the X direction of the first power feed point 21 with respect to the second center 102A in the second radiation element 102.

The first radiation element 101 and the second radiation element 102 have the second power feed points 22 located at the same position in the Y direction with respect to the centers of the radiation elements. Specifically, the position in the Y direction of the second power feed point 22 with respect to the first center 101A in the first radiation element 101 is the same as the position in the Y direction of the second power feed point 22 with respect to the second center 102A in the second radiation element 102.

A center line C1 parallel to the Y direction is set between the first radiation element 101 and the second radiation element 102. A distance from the center line C1 to the first radiation element 101 is equal to a distance from the center line C1 to the second radiation element 102. The first radiation element 101 and the second radiation element 102 are located such that the first power feed point 21 and the second power feed point 22 are line-symmetrical with respect to the center line C1 as a symmetry axis.

[Effects of Array Antenna of First Embodiment]

With the array antenna 100 of the present embodiment, in the first radiation element 101, the second power feed point 22 is located at a position of +θ° (+90°) with respect to the first reference line L1. In the second radiation element 102, the second power feed point 22 is located at a position of −θ° (−90°) with respect to the second reference line L2. Hereinafter, in one radiation element R, an angle when the reference line is rotated in the circumferential direction with respect to the center of the radiation element R until it overlaps the second power feed point 22 will be referred to as a relative angle.

A phase of an unnecessary polarized wave with respect to a main polarized wave (first polarized wave and second polarized wave) radiated by the radiation element depends on an orientation of the radiation element. (For example, when a main polarized wave is the first polarized wave, the unnecessary polarized wave is the second polarized wave, and when the main polarized wave is the second polarized wave, the unnecessary polarized wave is the first polarized wave.) Accordingly, a relative angle between the first power feed point 21 and the second power feed point 22 is different between the first radiation element 101 and the second radiation element 102 adjacent to each other, so that unnecessary polarized waves of the first radiation element 101 and the second radiation element 102 are canceled out. Therefore, in the array antenna 100, it is possible to improve a polarization ratio as compared with a case where the relative angles between the power feed points in the two radiation elements are the same. Accordingly, in the array antenna 100, it is possible to reduce unnecessary polarized waves.

In the array antenna 100, the number of radiation elements (first radiation elements 101) in which the second power feed point 22 is located at the position of +θ° is equal to the number of radiation elements (second radiation elements 102) in which the second power feed point 22 is located at the position of −θ°, so that the unnecessary polarized waves of the radiation elements 101 and 102 are canceled out. Accordingly, it is possible to efficiently reduce unnecessary polarized waves. Note that, even in a case where the number of the radiation elements in which the second power feed point 22 is located at the position of +θ° is different from the number of the radiation elements in which the second power feed point 22 is located at the position of −θ°, part of the unnecessary polarized waves of the radiation elements is canceled out.

In the array antenna 100, the radiation elements 101 and 102 having different relative angles between the first power feed point 21 and the second power feed point 22 are adjacent to each other, so that the effect of canceling out the unnecessary polarized waves can be enhanced as compared with a case where the radiation elements having different relative angles between the power feed points 21 and 22 are separated from each other.

In the array antenna 100, the first radiation element 101 and the second radiation element 102 are located such that the first power feed point 21 and the second power feed point 22 are line-symmetrical with respect to the center line C1 as a symmetry axis. Therefore, it is possible to enhance the effect of canceling out the unnecessary polarized waves of the radiation elements 101 and 102.

[Array Antenna]

Second Embodiment

Figure 2:
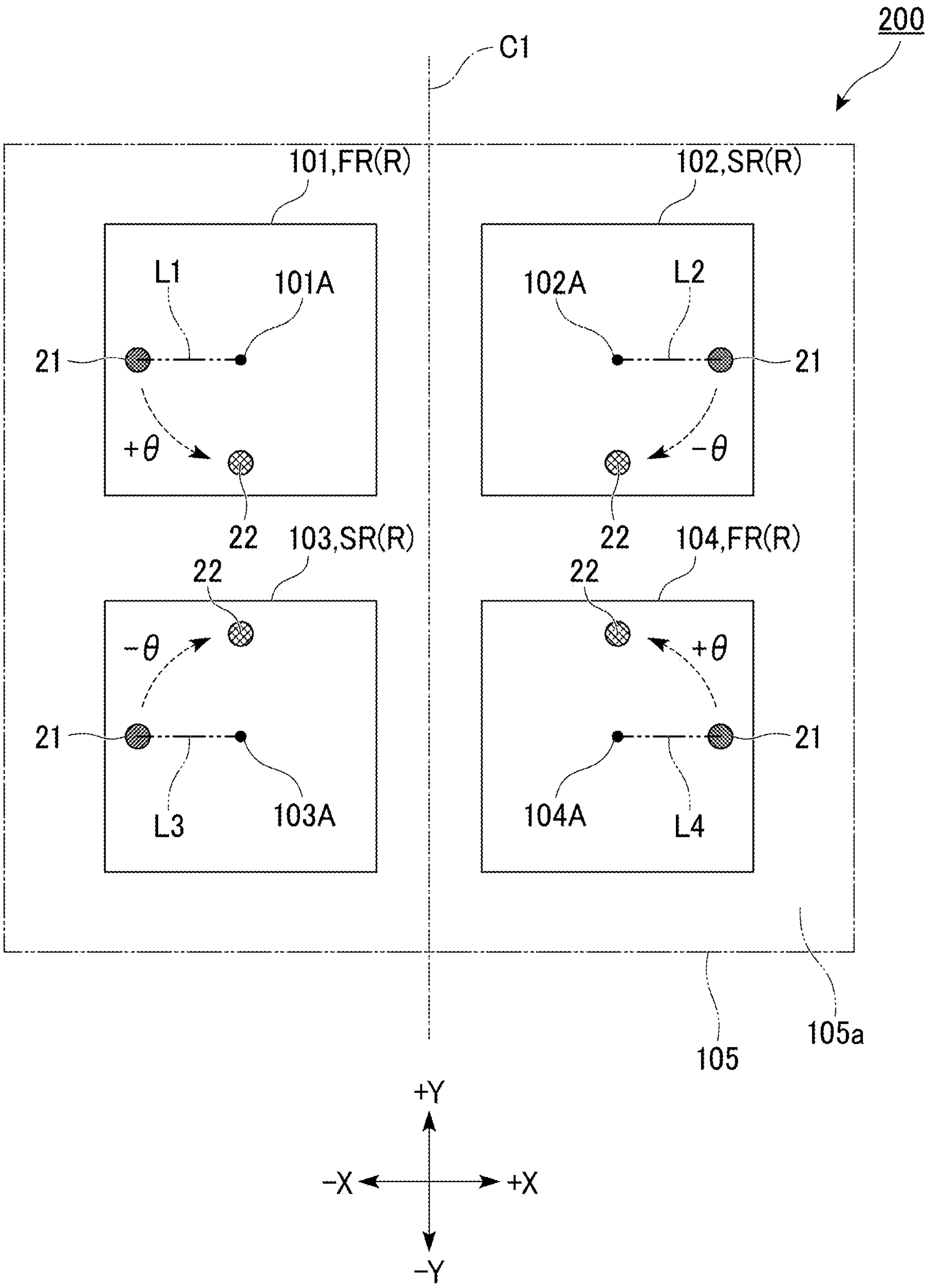
FIG. 2 A plan view of an array antenna of a second embodiment.

FIG. 2 is a plan view of an array antenna 200 according to a second embodiment. Configurations common to other embodiments will be denoted by the same reference numerals, and the descriptions thereof will be omitted.

As shown in FIG. 2, the array antenna 200 includes a first radiation element 101, a second radiation element 102, a third radiation element 103, a fourth radiation element 104, and a substrate 105. The array antenna 200 is different from the array antenna 100 (see FIG. 1) in that the array antenna 200 includes the third radiation element 103 and the fourth radiation element 104. The array antenna 200 is a phased array antenna.

The third radiation element 103 and the fourth radiation element 104 are formed on one surface 105*a* of the substrate 105, as with the first radiation element 101 and the second radiation element 102. The third radiation element 103 and the fourth radiation element 104 are examples of radiation elements. The first radiation element 101, the second radiation element 102, the third radiation element 103, and the fourth radiation element 104 may be collectively referred to as "radiation elements 101 to 104". The radiation elements 101 to 104 are, for example, patch antennas.

The radiation elements 101 to 104 are formed in a rectangular shape (for example, a square shape). The third radiation element 103 and the fourth radiation element 104 may have the same shape as the first radiation element 101 in plan view.

A third center 103A (center) is set in the third radiation element 103. The third center 103A is located, for example, at the center of gravity of the third radiation element 103 having a rectangular shape in plan view. The center of gravity of the third radiation element 103 is an intersection of two diagonals of the third radiation element 103. A fourth center 104A (center) is set in the fourth radiation element 104. The fourth center 104A is located, for example, at the center of gravity of the fourth radiation element 104 having a rectangular shape in plan view. The center of gravity of the fourth radiation element 104 is an intersection of two diagonals of the fourth radiation element 104.

The radiation elements 101 to 104 are arranged in an array (matrix). The array (matrix) of the present embodiment is a two-dimensional arrangement form having a plurality of rows and a plurality of columns.

The third radiation element 103 is located on the −Y direction side with respect to the first radiation element 101. The first radiation element 101 and the third radiation element 103 are arranged in the Y direction at intervals. The first radiation element 101 is adjacent to the third radiation element 103 in the Y direction.

The fourth radiation element 104 is located on the +X direction side with respect to the third radiation element 103. The third radiation element 103 and the fourth radiation element 104 are arranged in the X direction at intervals. The third radiation element 103 is adjacent to the fourth radiation element 104 in the X direction. The fourth radiation element 104 is located on the −Y direction side with respect to the second radiation element 102. The second radiation element 102 and the fourth radiation element 104 are arranged in the Y direction at intervals. The second radiation element 102 is adjacent to the fourth radiation element 104 in the Y direction.

The radiation elements 101 to 104 are arranged in a matrix of 2 rows×2 columns.

The radiation elements 101 to 104 can excite two polarized waves. Specifically, the radiation elements 101 to 104 can excite a first polarized wave and a second polarized wave. The second polarized wave is different from the first polarized wave. For example, a polarization plane of the second polarized wave is orthogonal to a polarization plane of the first polarized wave.

In plan view, one first power feed point 21 and one second power feed point 22 are disposed in each of regions of the radiation elements 101 to 104. The first power feed point 21 is provided to excite the first polarized wave. The second power feed point 22 is provided to excite the second polarized wave. The power feed points 21 and 22 of the radiation elements 101 to 104 are electrically connected to a common integrated circuit via a wiring line. Note that the radiation element and the integrated circuit may be connected by electromagnetic coupling.

In the third radiation element 103, the first power feed point 21 and the second power feed point 22 are located away from the third center 103A. In the third radiation element 103, the first power feed point 21 is located on the −X direction side with respect to the third center 103A. A straight line extending from the third center 103A to the first power feed point 21 in plan view is referred to as a third reference line L3 (reference line).

In the third radiation element 103, the second power feed point 22 is located on the +Y direction side with respect to the third center 103A. The second power feed point 22 is located at a position of −θ° (0<θ≤90) in a circumferential direction of the third center 103A with respect to the third reference line L3. In the present embodiment, the second power feed point 22 is located at a position of −90° in the circumferential direction of the third center 103A with respect to the third reference line L3.

In the fourth radiation element 104, the first power feed point 21 and the second power feed point 22 are located away from the fourth center 104A. In the fourth radiation element 104, the first power feed point 21 is located on the +X direction side with respect to the fourth center 104A. A straight line extending from the fourth center 104A to the first power feed point 21 in plan view is referred to as a fourth reference line LA (reference line).

In the fourth radiation element 104, the second power feed point 22 is located on the +Y direction side with respect to the fourth center 104A. The second power feed point 22 is located at a position of +θ° (0<θ≤90) in a circumferential direction of the fourth center 104A with respect to the fourth reference line LA. In the present embodiment, the second power feed point 22 is located at a position of +90° in the circumferential direction of the fourth center 104A with respect to the fourth reference line LA.

In the present embodiment, the first radiation element 101 and the fourth radiation element 104 are the first radiation elements FR, and the second radiation element 102 and the third radiation element 103 are the second radiation elements SR. The first radiation element FR is adjacent to the second radiation elements SR in the X direction and in the Y direction. The second radiation element SR is adjacent to the first radiation elements FR in the X direction and in the Y direction. That is, the first radiation element FR and the second radiation element SR are alternately disposed in the X direction and in the Y direction.

The third radiation element 103 and the fourth radiation element 104 have the first power feed points 21 located at different positions in the X direction with respect to the centers of the radiation elements. Specifically, the position in the X direction of the first power feed point 21 with respect to the third center 103A in the third radiation element 103 is different from the position in the X direction of the first power feed point 21 with respect to the fourth center 104A in the fourth radiation element 104.

The third radiation element 103 and the fourth radiation element 104 have the second power feed points 22 located at the same position in the Y direction with respect to the centers of the radiation elements. Specifically, the position in the Y direction of the second power feed point 22 with respect to the third center 103A in the third radiation element 103 is the same as the position in the Y direction of the second power feed point 22 with respect to the fourth center 104A in the fourth radiation element 104.

The first radiation element 101 and the third radiation element 103 have the first power feed points 21 located at the same position in the X direction with respect to the centers of the radiation elements. Specifically, the position in the X direction of the first power feed point 21 with respect to the first center 101A in the first radiation element 101 is the same as the position in the X direction of the first power feed point 21 with respect to the third center 103A in the third radiation element 103.

The first radiation element 101 and the third radiation element 103 have the second power feed points 22 located at different positions in the Y direction with respect to the centers of the radiation elements. Specifically, the position in the Y direction of the second power feed point 22 with respect to the first center 101A in the first radiation element 101 is different from the position in the Y direction of the second power feed point 22 with respect to the third center 103A in the third radiation element 103.

The second radiation element 102 and the fourth radiation element 104 have the first power feed points 21 located at the same position in the X direction with respect to the centers of the radiation elements. Specifically, the position in the X direction of the first power feed point 21 with respect to the second center 102A in the second radiation element 102 is the same as the position in the X direction of the first power feed point 21 with respect to the fourth center 104A in the fourth radiation element 104.

The second radiation element 102 and the fourth radiation element 104 have the second power feed points 22 located at different positions in the Y direction with respect to the centers of the radiation elements. Specifically, the position in the Y direction of the second power feed point 22 with respect to the second center 102A in the second radiation element 102 is different from the position in the Y direction of the second power feed point 22 with respect to the fourth center 104A in the fourth radiation element 104.

A distance from the center line C1 to the third radiation element 103 is equal to a distance from the center line C1 to the fourth radiation element 104. In addition, the distance from the center line C1 to the third radiation element 103 and the distance from the center line C1 to the fourth radiation element 104 are equal to a distance from the center line C1 to the first radiation element 101 (or a distance from the center line C1 to the second radiation element 102). The third radiation element 103 and the fourth radiation element 104 are located such that the first power feed point 21 and the second power feed point 22 are line-symmetrical with respect to the center line C1 as a symmetry axis.

[Effects of Array Antenna of Second Embodiment]

With the array antenna 200 of the present embodiment, in the first radiation element 101, the second power feed point 22 is located at a position of +θ° (+90°) with respect to the first reference line L1. In the second radiation element 102, the second power feed point 22 is located at a position of −θ° (−90°) with respect to the second reference line L2. Since the relative angle between the power feed points 21 and 22 is different between the radiation elements 101 and 102 adjacent to each other in the X direction, the unnecessary polarized waves of the radiation elements 101 and 102 are canceled out. Accordingly, it is possible to reduce the unnecessary polarized waves.

With the array antenna 200, the radiation elements 103 and 104 adjacent to each other in the X direction have different relative angles between the power feed points 21 and 22, as with the radiation elements 101 and 102. Therefore, the unnecessary polarized waves of the radiation elements 103 and 104 are canceled out. Accordingly, it is possible to reduce the unnecessary polarized waves.

In the array antenna 200, the number of radiation elements (radiation elements 101 and 104) in which the second power feed point 22 is located at the position of +θ° is equal to the number of radiation elements (radiation elements 102 and 103) in which the second power feed point 22 is located at the position of −θ°, so that the unnecessary polarized waves of the radiation elements 101 to 104 are canceled out. Accordingly, it is possible to efficiently reduce unnecessary polarized waves. Note that, even in a case where the number of the radiation elements in which the second power feed point 22 is located at the position of +θ° is different from the number of the radiation elements in which the second power feed point 22 is located at the position of −θ°, part of the unnecessary polarized waves of the radiation elements is canceled out.

In the array antenna 200, the radiation elements 101 to 104 having different relative angles between the first power feed point 21 and the second power feed point 22 are adjacent to each other. More specifically, in the present embodiment, the first radiation element FR and the second radiation element SR are alternately disposed in the X direction and in the Y direction. Therefore, the effect of canceling out the unnecessary polarized waves can be enhanced as compared with a case where the radiation elements having different relative angles between the power feed points 21 and 22 are separated from each other.

In the array antenna 200, the radiation elements 101 and 102 are located such that the power feed points 21 and 22 are line-symmetrical with respect to the center line C1 as a symmetry axis. The radiation elements 103 and 104 are located such that the power feed points 21 and 22 are line-symmetrical with respect to the center line C1 as a symmetry axis. Specifically, a pair of the radiation elements 101 and 103 and a pair of the radiation elements 102 and 104 are located such that the power feed points 21 and 22 are line-symmetrical with respect to the center line C1 as a symmetry axis. Therefore, it is possible to enhance the effect of canceling out the unnecessary polarized waves of the radiation elements 101 to 104.

[Array Antenna]

Third Embodiment

Figure 3:
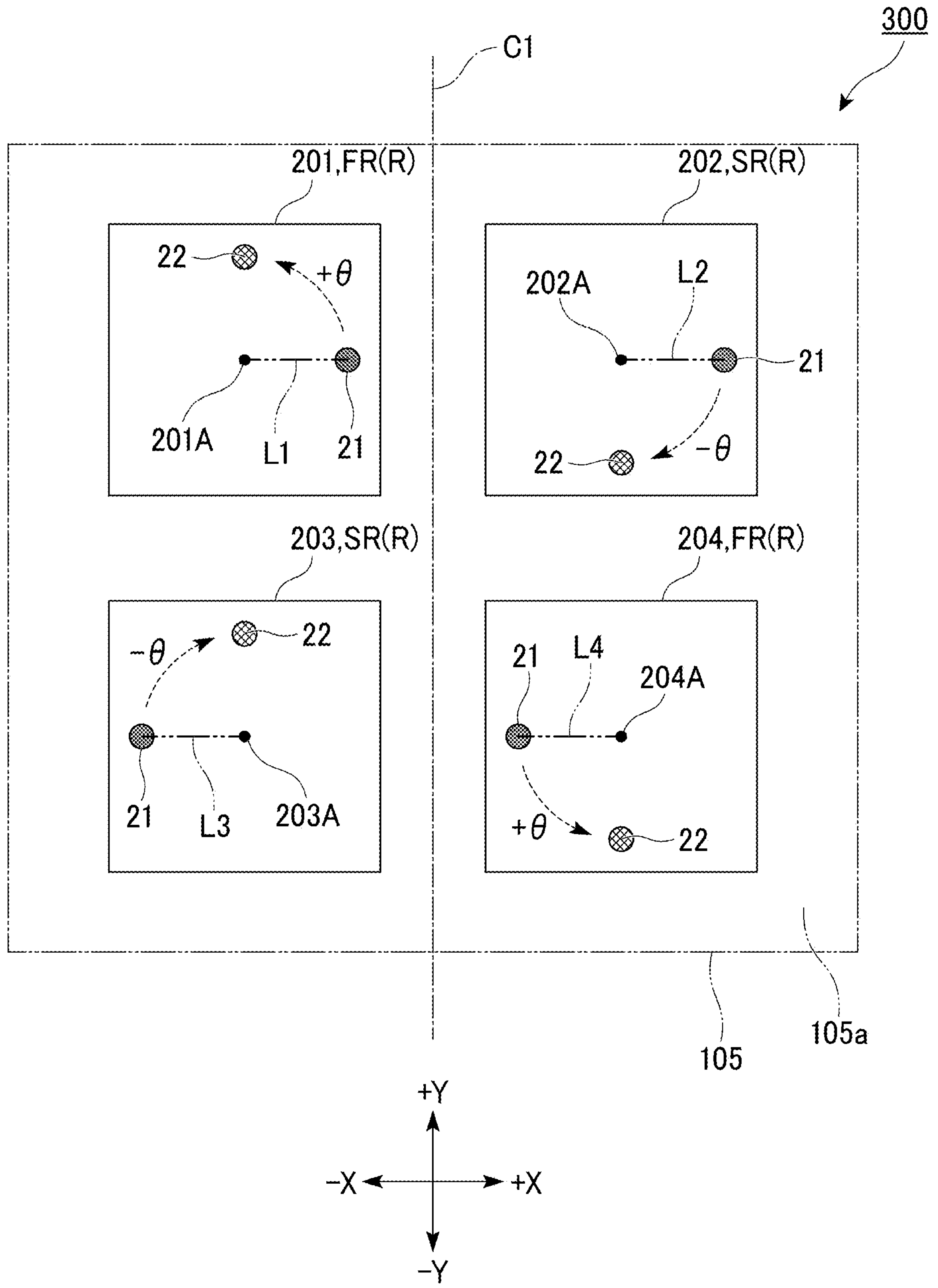
FIG. 3 A plan view of an array antenna of a third embodiment.

FIG. 3 is a plan view of an array antenna 300 according to a third embodiment. Configurations common to other embodiments will be denoted by the same reference numerals, and the descriptions thereof will be omitted.

As shown in FIG. 3, the array antenna 300 is different from the array antenna 200 (see FIG. 2) in that the array antenna 300 includes radiation elements 201 to 204 instead of the radiation elements 101 to 104. The radiation elements 201 to 204 are arranged in a matrix of 2 rows×2 columns. The array antenna 300 is a phased array antenna. The radiation elements 201 to 204 are, for example, patch antennas.

In the first radiation element 201, the first power feed point 21 is located on the +X direction side with respect to a first center 201A. A straight line extending from the first center 201A to the first power feed point 21 in plan view is the first reference line L1.

In the first radiation element 201, the second power feed point 22 is located on the +Y direction side with respect to the first center 201A. The second power feed point 22 is located at a position of +θ° (0<θ≤90) in a circumferential direction of the first center 201A with respect to the first reference line L1. In the present embodiment, the second power feed point 22 is located at a position of +90° in the circumferential direction of the first center 201A with respect to the first reference line L1.

In the second radiation element 202, the first power feed point 21 is located on the +X direction side with respect to a second center 202A. A straight line extending from the second center 202A to the first power feed point 21 in plan view is the second reference line L2.

In the second radiation element 202, the second power feed point 22 is located on the −Y direction side with respect to the second center 202A. The second power feed point 22 is located at a position of −θ° (0<θ≤90) in a circumferential direction of the second center 202A with respect to the second reference line L2. In the present embodiment, the second power feed point 22 is located at a position of −90° in the circumferential direction of the second center 202A with respect to the second reference line L2.

In the third radiation element 203, the first power feed point 21 is located on the −X direction side with respect to a third center 203A. A straight line extending from the third center 203A to the first power feed point 21 in plan view is the third reference line L3.

In the third radiation element 203, the second power feed point 22 is located on the +Y direction side with respect to the third center 203A. The second power feed point 22 is located at a position of −θ° (0<θ≤90) in a circumferential direction of the third center 203A with respect to the third reference line L3. In the present embodiment, the second power feed point 22 is located at a position of −90° in the circumferential direction of the third center 203A with respect to the third reference line L3.

In the fourth radiation element 204, the first power feed point 21 is located on the −X direction side with respect to a fourth center 204A. A straight line extending from the fourth center 204A to the first power feed point 21 in plan view is the fourth reference line L4.

In the fourth radiation element 204, the second power feed point 22 is located on the −Y direction side with respect to the fourth center 204A. The second power feed point 22 is located at a position of +θ° (0<θ≤90) in a circumferential direction of the fourth center 204A with respect to the fourth reference line LA. In the present embodiment, the second power feed point 22 is located at a position of +90° in the circumferential direction of the fourth center 204A with respect to the fourth reference line LA.

In the present embodiment, the first radiation element 201 and the fourth radiation element 204 are the first radiation elements FR, and the second radiation element 202 and the third radiation element 203 are the second radiation elements SR. The first radiation element FR is adjacent to the second radiation elements SR in the X direction and in the Y direction. The second radiation element SR is adjacent to the first radiation elements FR in the X direction and in the Y direction. That is, the first radiation element FR and the second radiation element SR are alternately disposed in the X direction and in the Y direction.

The first radiation element 201 and the second radiation element 202 have the first power feed points 21 located at the same position in the X direction with respect to the centers of the radiation elements. Specifically, the position in the X direction of the first power feed point 21 with respect to the first center 201 A in the first radiation element 201 is the same as the position in the X direction of the first power feed point 21 with respect to the second center 202A in the second radiation element 202.

The first radiation element 201 and the second radiation element 202 have the second power feed points 22 located at different positions in the Y direction with respect to the centers of the radiation elements. Specifically, the position in the Y direction of the second power feed point 22 with respect to the first center 201A in the first radiation element 201 is different from the position in the Y direction of the second power feed point 22 with respect to the second center 202A in the second radiation element 202.

The third radiation element 203 and the fourth radiation element 204 have the first power feed points 21 located at the same position in the X direction with respect to the centers of the radiation elements. Specifically, the position in the X direction of the first power feed point 21 with respect to the third center 203A in the third radiation element 203 is the same as the position in the X direction of the first power feed point 21 with respect to the fourth center 204A in the fourth radiation element 204.

The third radiation element 203 and the fourth radiation element 204 have the second power feed points 22 located at different positions in the Y direction with respect to the centers of the radiation elements. Specifically, the position in the Y direction of the second power feed point 22 with respect to the third center 203A in the third radiation element 203 is different from the position in the Y direction of the second power feed point 22 with respect to the fourth center 204A in the fourth radiation element 204.

The first radiation element 201 and the third radiation element 203 have the first power feed points 21 located at different positions in the X direction with respect to the centers of the radiation elements. Specifically, the position in the X direction of the first power feed point 21 with respect to the first center 201A in the first radiation element 201 is different from the position in the X direction of the first power feed point 21 with respect to the third center 203A in the third radiation element 203.

The first radiation element 201 and the third radiation element 203 have the second power feed points 22 located at the same position in the Y direction with respect to the centers of the radiation elements. Specifically, the position in the Y direction of the second power feed point 22 with respect to the first center 201A in the first radiation element 201 is the same as the position in the Y direction of the second power feed point 22 with respect to the third center 203A in the third radiation element 203.

The second radiation element 202 and the fourth radiation element 204 have the first power feed points 21 located at different positions in the X direction with respect to the centers of the radiation elements. Specifically, the position in the X direction of the first power feed point 21 with respect to the second center 202A in the second radiation element 202 is different from the position in the X direction of the first power feed point 21 with respect to the fourth center 204A in the fourth radiation element 204.

The second radiation element 202 and the fourth radiation element 204 have the second power feed points 22 located at the same position in the Y direction with respect to the centers of the radiation elements. Specifically, the position in the Y direction of the second power feed point 22 with respect to the second center 202A in the second radiation element 202 is the same as the position in the Y direction of the second power feed point 22 with respect to the fourth center 204A in the fourth radiation element 204.

[Effects of Array Antenna of Third Embodiment]

With the array antenna 300 of the present embodiment, in the first radiation element 201, the second power feed point 22 is located at a position of +θ° (+90°) with respect to the first reference line L1. In the second radiation element 202, the second power feed point 22 is located at a position of −θ° (−90°) with respect to the second reference line L2. Since the relative angle between the power feed points 21 and 22 is different between the radiation elements 201 and 202 adjacent to each other in the X direction, the unnecessary polarized waves of the radiation elements 201 and 202 are canceled out. Accordingly, it is possible to reduce the unnecessary polarized waves.

In the array antenna 300, the radiation elements 203 and 204 adjacent to each other in the X direction also have different relative angles between the power feed points 21 and 22. Therefore, the unnecessary polarized waves of the radiation elements 203 and 204 are canceled out. Accordingly, it is possible to reduce the unnecessary polarized waves.

In the array antenna 300, the number of radiation elements (radiation elements 201 and 204) in which the second power feed point 22 is located at the position of +θ° is equal to the number of radiation elements (radiation elements 202 and 203) in which the second power feed point 22 is located at the position of −θ°, so that the unnecessary polarized waves of the radiation elements 201 to 204 are canceled out. Accordingly, it is possible to efficiently reduce unnecessary polarized waves. Note that, even in a case where the number of the radiation elements in which the second power feed point 22 is located at the position of +θ° is different from the number of the radiation elements in which the second power feed point 22 is located at the position of −θ°, part of the unnecessary polarized waves of the radiation elements is canceled out.

The radiation elements 201 and 202 adjacent to each other in the X direction have the second power feed points 22 located at different positions in the Y direction with respect to the centers of the radiation elements, so that the distance between the second power feed points 22 of the radiation elements adjacent to each other in the X direction can be increased, thereby improving isolation. The radiation elements 203 and 204 adjacent to each other in the X direction also have the second power feed points 22 located at different positions in the Y direction with respect to the centers of the radiation elements, so that the distance between the second power feed points 22 of the radiation elements adjacent to each other in the X direction can be increased, thereby improving isolation.

For example, when a plurality of the array antennas 300 are arranged in the Y direction, the distance between the second power feed point 22 of one array antenna 300 and the second power feed point 22 of the other array antenna 300 among the adjacent array antennas 300 can be increased, thereby improving isolation. Accordingly, it is possible to suppress interference of electromagnetic waves between the array antennas 300.

The radiation elements 201 and 203 adjacent to each other in the Y direction have the first power feed points 21 located at different positions in the X direction with respect to the centers of the radiation elements, so that the distance between the first power feed points 21 of the radiation elements adjacent to each other in the Y direction can be increased, thereby improving isolation. The radiation elements 202 and 204 adjacent to each other in the Y direction also have the first power feed points 21 located at different positions in the X direction with respect to the centers of the radiation elements, so that the distance between the first power feed points 21 of the radiation elements adjacent to each other in the Y direction can be increased, thereby improving isolation.

For example, when a plurality of the array antennas 300 are arranged in the X direction, the distance between the first power feed point 21 of one array antenna 300 and the first power feed point 21 of the other array antenna 300 among the adjacent array antennas 300 can be increased, thereby improving isolation. Accordingly, it is possible to suppress interference of electromagnetic waves between the array antennas 300.

The radiation elements 201 and 202 adjacent to each other in the X direction have the first power feed points 21 located at the same position in the X direction with respect to the centers of the radiation elements, so that the distance between the first power feed points 21 of the radiation elements adjacent to each other can be increased, thereby improving isolation. The radiation elements 203 and 204 adjacent to each other in the X direction also have the first power feed points 21 located at the same position in the X direction with respect to the centers of the radiation elements, so that the distance between the first power feed points 21 of the radiation elements adjacent to each other can be increased, thereby improving isolation.

The radiation elements 201 and 203 adjacent to each other in the Y direction have the second power feed points 22 located at the same position in the Y direction with respect to the centers of the radiation elements, so that the distance between the second power feed points 22 of the radiation elements adjacent to each other can be increased, thereby improving isolation. The radiation elements 202 and 204 adjacent to each other in the Y direction also have the second power feed points 22 located at the same position in the Y direction with respect to the centers of the radiation elements, so that the distance between the second power feed points 22 of the radiation elements adjacent to each other can be increased, thereby improving isolation.

[Array Antenna]

Fourth Embodiment

Figure 4:
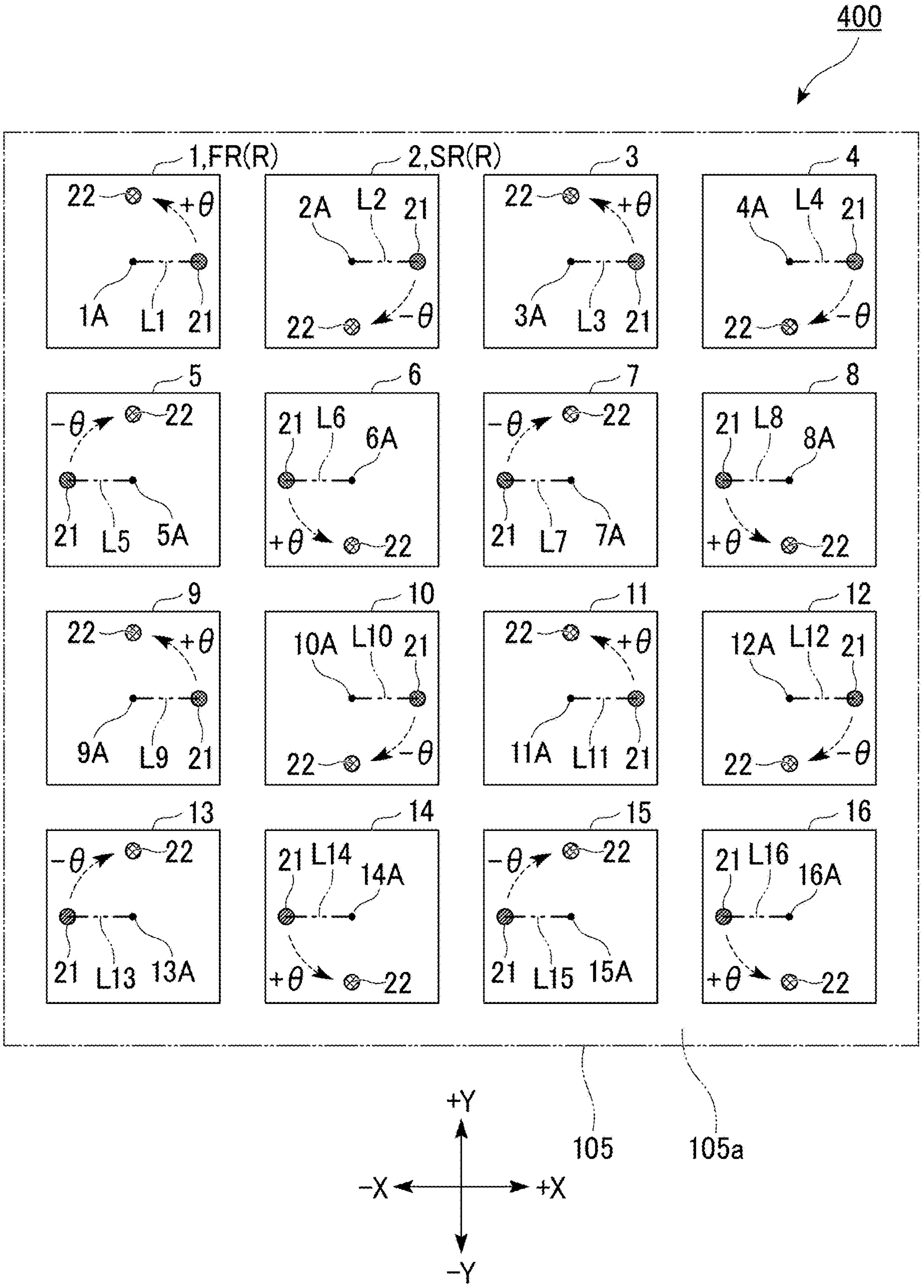
FIG. 4 A plan view of an array antenna of a fourth embodiment.

FIG. 4 is a plan view of an array antenna 400 according to a fourth embodiment. Configurations common to other embodiments will be denoted by the same reference numerals, and the descriptions thereof will be omitted.

As shown in FIG. 4, the array antenna 400 is different from the array antenna 300 (see FIG. 3) in that the array antenna 400 includes radiation elements 1 to 16 instead of the radiation elements 201 to 204. The radiation elements 1 to 16 are arranged in a matrix of 4 rows×4 columns. The array antenna 400 is a phased array antenna. The radiation elements 1 to 16 are, for example, patch antennas.

The first radiation element 1 to the fourth radiation element 4 are arranged in the X direction. In the first radiation element 1 to the fourth radiation element 4, the first power feed point 21 is located on the +X direction side with respect to centers 1A to 4A. Straight lines from the centers 1A to 4A to the first power feed point 21 in plan view are reference lines L1 to L4.

In the first radiation element 1 and the third radiation element 3, the second power feed point 22 is located on the +Y direction side with respect to the centers 1A and 3A. The second power feed point 22 is located at a position of +θ° (0<θ≤90) in the circumferential direction with respect to the reference lines L1 and L3. In the present embodiment, the second power feed point 22 is located at a position of +90° in the circumferential direction of the centers 1A and 3A with respect to the reference lines L1 and L3.

In the second radiation element 2 and the fourth radiation element 4, the second power feed point 22 is located on the −Y direction side with respect to the centers 2A and 4A. The second power feed point 22 is located at a position of −θ° (0<θ≤90) in the circumferential direction with respect to the reference lines L2 and L4. In the present embodiment, the second power feed point 22 is located at a position of −90° in the circumferential direction of the centers 2A and 4A with respect to the reference lines L2 and LA.

The fifth radiation element 5 to the eighth radiation element 8 are arranged in the X direction. The fifth radiation element 5 to the eighth radiation element 8 are located on the −Y direction side with respect to the first radiation element 1 to the fourth radiation element 4.

In the fifth radiation element 5 to the eighth radiation element 8, the first power feed point 21 is located on the −X direction side with respect to centers 5A to 8A. Straight lines from the centers 5A to 8A to the first power feed point 21 in plan view are reference lines L5 to L8.

In the fifth radiation element 5 and the seventh radiation element 7, the second power feed point 22 is located on the +Y direction side with respect to the centers 5A and 7A. The second power feed point 22 is located at a position of −θ°

(0<θ≤90) in the circumferential direction with respect to the reference lines L5 and L7. In the present embodiment, the second power feed point 22 is located at a position of −90° in the circumferential direction of the centers 5A and 7A with respect to the reference lines L5 and L7.

In the sixth radiation element 6 and the eighth radiation element 8, the second power feed point 22 is located on the −Y direction side with respect to the centers 6A and 8A. The second power feed point 22 is located at a position of +θ° (0<θ≤90) in the circumferential direction with respect to the reference lines L6 and L8. In the present embodiment, the second power feed point 22 is located at a position of +90° in the circumferential direction of the centers 6A and 8A with respect to the reference lines L6 and L8.

The ninth radiation element 9 to the twelfth radiation element 12 are arranged in the X direction. The ninth radiation element 9 to the twelfth radiation element 12 are located on the −Y direction side with respect to the fifth radiation element 5 to the eighth radiation element 8.

In the ninth radiation element 9 to the twelfth radiation element 12, the first power feed point 21 is located on the +X direction side with respect to centers 9A to 12A. Straight lines from the centers 9A to 12A to the first power feed point 21 in plan view are reference lines L9 to L12.

In the ninth radiation element 9 and the eleventh radiation element 11, the second power feed point 22 is located on the +Y direction side with respect to the centers 9A and 11A. The second power feed point 22 is located at a position of +θ° (0<θ≤90) in the circumferential direction with respect to the reference lines L9 and L11. In the present embodiment, the second power feed point 22 is located at a position of +90° in the circumferential direction of the centers 9A and 11A with respect to the reference lines L9 and L11.

In the tenth radiation element 10 and the twelfth radiation element 12, the second power feed point 22 is located on the −Y direction side with respect to the centers 10A and 12A. The second power feed point 22 is located at a position of −θ° (0<θ≤90) in the circumferential direction with respect to the reference lines L10 and L12. In the present embodiment, the second power feed point 22 is located at a position of −90° in the circumferential direction of the centers 10A and 12A with respect to the reference lines L10 and L12.

The thirteenth radiation element 13 to the sixteenth radiation element 16 are arranged in the X direction. The thirteenth radiation element 13 to the sixteenth radiation element 16 are located on the −Y direction side with respect to the ninth radiation element 9 to the twelfth radiation element 12.

In the thirteenth radiation element 13 to the sixteenth radiation element 16, the first power feed point 21 is located on the −X direction side with respect to centers 13A to 16A. Straight lines from the centers 13A to 16A to the first power feed point 21 in plan view are reference lines L13 to L16.

In the thirteenth radiation element 13 and the fifteenth radiation element 15, the second power feed point 22 is located on the +Y direction side with respect to the centers 13A and 15A. The second power feed point 22 is located at a position of −θ° (0<θ≤90) in the circumferential direction with respect to the reference lines L13 and L15. In the present embodiment, the second power feed point 22 is located at a position of −90° in the circumferential direction of the centers 13A and 15A with respect to the reference lines L13 and L15.

In the fourteenth radiation element 14 and the sixteenth radiation element 16, the second power feed point 22 is located on the −Y direction side with respect to the centers 14A and 16A. The second power feed point 22 is located at a position of +θ° (0<θ≤90) in the circumferential direction with respect to the reference lines L14 and L16. In the present embodiment, the second power feed point 22 is located at a position of +90° in the circumferential direction of the centers 14A and 16A with respect to the reference lines L14 and L16.

In the present embodiment, among the first to sixteenth radiation elements 1 to 16, the first radiation element 1, the third radiation element 3, the sixth radiation element 6, the eighth radiation element 8, the ninth radiation element 9, the eleventh radiation element 11, the fourteenth radiation element 14, and the sixteenth radiation element 16 are the first radiation element FR, and the others are the second radiation element SR. The first radiation element FR is adjacent to the second radiation elements SR in the X direction and in the Y direction. The second radiation element SR is adjacent to the first radiation elements FR in the X direction and in the Y direction. That is, the first radiation element FR and the second radiation element SR are alternately disposed in the X direction and in the Y direction.

The radiation elements adjacent to each other in the X direction have the first power feed points 21 located at the same position in the X direction with respect to the centers of the radiation elements. The radiation elements adjacent to each other in the X direction have the second power feed points 22 located at different positions in the Y direction with respect to the centers of the radiation elements.

The radiation elements adjacent to each other in the Y direction have the first power feed points 21 located at different positions in the X direction with respect to the centers of the radiation elements. The radiation elements adjacent to each other in the Y direction have the second power feed points 22 located at the same position in the Y direction with respect to the centers of the radiation elements.

[Effects of Array Antenna of Fourth Embodiment]

With the array antenna 400 of the present embodiment, a relative angle between the first power feed point 21 and the second power feed point 22 is different between the radiation elements adjacent to each other in the X direction, so that the unnecessary polarized waves are canceled out. Accordingly, it is possible to reduce the unnecessary polarized waves. In the present embodiment, the number of the radiation elements in which the second power feed point 22 is located at the position of +θ° is equal to the number of the radiation elements in which the second power feed point 22 is located at the position of −θ°. However, even in a case where the number of the radiation elements in which the second power feed point 22 is located at the position of +θ° is different from the number of the radiation elements in which the second power feed point 22 is located at the position of −θ°, part of the unnecessary polarized waves of the radiation elements is canceled out.

The radiation elements adjacent to each other in the X direction have the second power feed points 22 located at different positions in the Y direction with respect to the centers of the radiation elements, so that the distance between the second power feed points 22 of the radiation elements adjacent to each other in the X direction can be increased, thereby improving isolation.

The radiation elements adjacent to each other in the Y direction have the first power feed points 21 located at different positions in the X direction with respect to the centers of the radiation elements, so that isolation can be improved.

The radiation elements adjacent to each other in the X direction have the first power feed points 21 located at the same position in the X direction with respect to the centers of the radiation elements, so that the distance between the first power feed points 21 of the radiation elements adjacent to each other in the X direction can be increased, thereby improving isolation.

The radiation elements adjacent to each other in the Y direction have the second power feed points 22 located at the same position in the Y direction with respect to the centers of the radiation elements, so that the distance between the second power feed points 22 of the radiation elements adjacent to each other in the Y direction can be increased, thereby improving isolation.

[Array Antenna]

Fifth Embodiment

Figure 5:
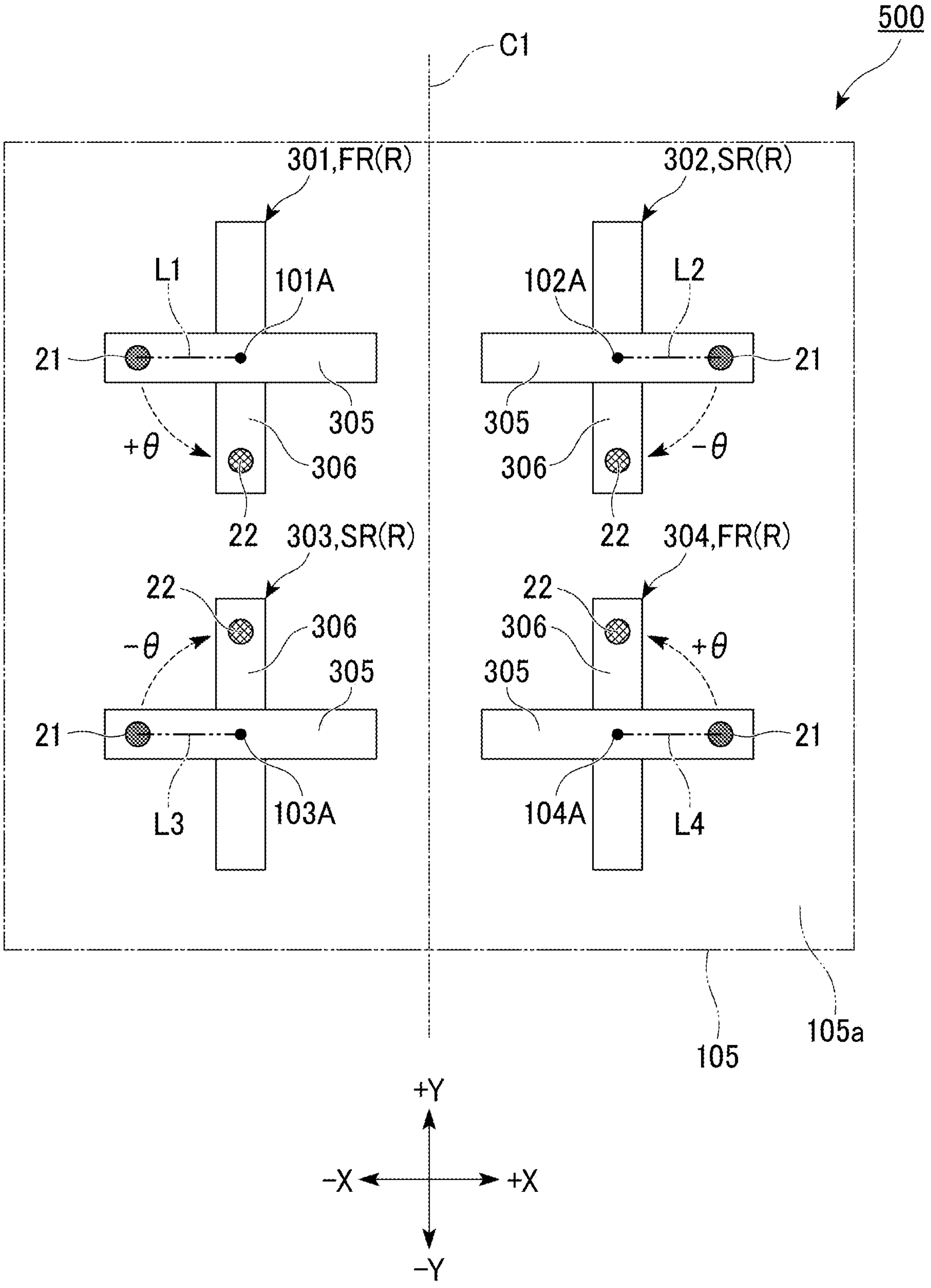
FIG. 5 A plan view of an array antenna of a fifth embodiment.

FIG. 5 is a plan view of an array antenna 500 according to a fifth embodiment. Configurations common to other embodiments will be denoted by the same reference numerals, and the descriptions thereof will be omitted.

As shown in FIG. 5, the array antenna 500 is different from the array antenna 200 (see FIG. 2) in that the array antenna 500 includes radiation elements 301 to 304 instead of the radiation elements 101 to 104. The radiation elements 301 to 304 are, for example, L-shaped antennas.

The array antenna 500 has the same configuration as the array antenna 200 (see FIG. 2) for the first power feed point 21 and the second power feed point 22.

Each of the radiation elements 301 to 304 is formed by combining a first linear element 305 and a second linear element 306. The first linear element 305 has a linear shape extending in the X direction. The second linear element 306 has a linear shape extending in the Y direction. In plan view, the radiation elements 301 to 304 are formed in a cross shape in which the first linear element 305 and the second linear element 306 intersect each other at the center in a length direction.

The array antenna 500 has the same configuration as the array antenna 200 (see FIG. 2) for the first power feed point 21 and the second power feed point 22, so that the same effect as the array antenna 200 is exhibited.

The present invention is not limited to the above examples, and can be modified as appropriate without departing from the spirit of the invention.

In the array antenna 100 (see FIG. 1) according to the first embodiment, two radiation elements 101 and 102 are arranged in an array, but the number of the radiation elements arranged in an array is not particularly limited. The number of the radiation elements arranged in an array may be plural (any number of 2 or more).

In the array antennas 200, 300, and 400 (see FIGS. 2 to 4), the radiation elements are arranged in a matrix of 2 rows×2 columns or 4 rows×4 columns, but the number of the rows and columns of the radiation elements arranged in a matrix is not particularly limited. The number of the rows and columns of the radiation elements arranged in a matrix shape may be plural (any number of 2 or more).

In the array antennas 100, 200, 300, and 400 (see FIGS. 1 to 4), half of the plurality of radiation elements are radiation elements in which the second power feed point 22 is located at a position of $+\theta°$. The remaining half are radiation elements in which the second power feed point 22 is located at a position of $-\theta°$. The number of the radiation elements in which the second power feed point is located at a position of $+\theta°$ is not particularly limited, and it is sufficient that there is at least one of the plurality of radiation elements. The number of the radiation elements in which the second power feed point is located at a position of $-\theta°$ is not particularly limited, and it is sufficient that there is at least one of the plurality of radiation elements.

In the array antennas 100, 200, 300, and 400 (see FIGS. 1 to 4), the number of the radiation elements in which the second power feed point is located at the position of $+\theta°$ is equal to the number of the radiation elements in which the second power feed point is located at the position of $-\theta°$. However, the number of the radiation elements in which the second power feed point is located at the position of $+\theta°$ may be different from the number of the radiation elements in which the second power feed point is located at the position of $-\theta°$.

The array antenna of the embodiment may have a configuration in which the second power feed point is located at a position of $+\theta1°$ ($0<\theta1\leq 90$) with respect to the reference line in at least one radiation element, and the second power feed point is located at a position of $-\theta2°$ ($0<\theta2\leq 90$) with respect to the reference line in at least one radiation element. $\theta1$ and $\theta2$ may be different from each other, but it is preferable that $\theta1$ and $\theta2$ are the same ($\theta1=\theta2$).

In the array antennas 200, 300, and 400 (see FIGS. 2 to 4), the radiation elements are arranged in the X direction (first direction) and the Y direction (second direction) orthogonal to each other, but the first direction and the second direction in which the radiation elements are arranged need only be directions intersecting each other. An intersection angle between the first direction and the second direction is not limited to 90° and may be, for example, greater than 0° and less than 90°.

The angle "θ" is preferably greater than 0 and equal to or less than 90 ($0<\theta\leq 90$), but may be greater than 0 and equal to or less than 180 ($0<\theta\leq 180$).

REFERENCE SIGNS LIST

1 to 16, 101 to 104, 201 to 204, 301 to 304, R Radiation element
21 First power feed point
22 Second power feed point
1A to 16A, 101A to 104A, 201A to 204A, 301A to 304A Center
L1 to L16 Reference line
X direction First direction
Y direction Second direction
FR First radiation element
SR Second radiation element

The invention claimed is:

1. An array antenna comprising:

a plurality of radiation elements that excite a first polarized wave and a second polarized wave different from the first polarized wave, wherein a first power feed point that excites the first polarized wave and a second power feed point that excites the second polarized wave are disposed on each of the radiation elements, the plurality of radiation elements are arranged in an array or in a matrix, and the plurality of radiation elements include a first radiation element in which the second power feed point is located at a position of $+\theta°$ ($0<\theta\leq 90$) in a direction circling around a center of each of the radiation elements with respect to a reference line extending from the center to the first power feed point, and a second radiation element in which the second power feed point is located at a position of $-\theta°$ in a direction circling around a center of each of the radiation elements with respect to a reference line extending from the center to the first power feed point.

2. The array antenna according to claim 1, wherein the number of the first radiation element having the second power feed point located at the position of +θ° is equal to the number of the second radiation element having the second power feed point located at the position of −θ°.

3. The array antenna according to claim 1, wherein the first radiation element having the second power feed point located at the position of +θ° is adjacent to the second radiation element having the second power feed point located at the position of −θ°.

4. The array antenna according to claim 1, wherein the plurality of radiation elements are arranged in a matrix in a first direction and a second direction intersecting the first direction, the radiation elements adjacent to each other in the first direction each has the second power feed point located at different positions in the second direction with respect to a center of each of the radiation elements, and the radiation elements adjacent to each other in the second direction each has the first power feed point located at different positions in the first direction with respect to a center of each of the radiation elements.

5. The array antenna according to claim 4, wherein the radiation elements adjacent to each other in the first direction each has the first power feed point located at the same position in the first direction with respect to a center of each of the radiation elements, and the radiation elements adjacent to each other in the second direction each has the second power feed point located at the same position in the second direction with respect to a center of each of the radiation elements.

* * * * *